(12) United States Patent
Jaynes et al.

(10) Patent No.: US 8,059,916 B2
(45) Date of Patent: Nov. 15, 2011

(54) HYBRID SYSTEM FOR MULTI-PROJECTOR GEOMETRY CALIBRATION

(75) Inventors: Christopher O. Jaynes, Denver, CO (US); Stephen B. Webb, Denver, CO (US)

(73) Assignee: Mersive Technologies, Inc., Denver, CO (US)

( * ) Notice: Subject to any disclaimer, the term of this patent is extended or adjusted under 35 U.S.C. 154(b) by 0 days.

(21) Appl. No.: 12/822,281

(22) Filed: Jun. 24, 2010

(65) Prior Publication Data

US 2010/0259602 A1 Oct. 14, 2010

Related U.S. Application Data

(62) Division of application No. 11/675,236, filed on Feb. 15, 2007, now Pat. No. 7,773,827.

(60) Provisional application No. 60/773,419, filed on Feb. 15, 2006.

(51) Int. Cl.
*G06K 9/32* (2006.01)

(52) U.S. Cl. ...................................... 382/293

(58) Field of Classification Search ........... 348/E13.022; 382/293; 700/98
See application file for complete search history.

(56) References Cited

U.S. PATENT DOCUMENTS

| | | | |
|---|---|---|---|
| 4,974,073 A | 11/1990 | Inova | |
| 5,136,390 A | 8/1992 | Inova et al. | |
| 5,734,446 A | 3/1998 | Tokoro et al. | |
| 6,115,022 A | 9/2000 | Mayer, III et al. | |
| 6,222,593 B1 | 4/2001 | Higurashi et al. | |
| 6,434,265 B1 | 8/2002 | Xiong et al. | |
| 6,456,339 B1 | 9/2002 | Surati et al. | |
| 6,480,175 B1 | 11/2002 | Schneider | |
| 6,545,685 B1 | 4/2003 | Dorbie | |
| 6,570,623 B1 | 5/2003 | Li et al. | |
| 6,590,621 B1 | 7/2003 | Creek et al. | |
| 6,633,276 B1 | 10/2003 | Jaynes | |

(Continued)

FOREIGN PATENT DOCUMENTS

JP 2007180979 7/2007

OTHER PUBLICATIONS

Webb, Stephen et al.; The DOME: A Portable Multi-Projector Visualization System for Digital Artifacts; IEEE Workshop on Emerging Display Technologies (wNR 2005); Mar. 2005; Bonn, Germany.*

(Continued)

*Primary Examiner* — Gregory F Cunningham
(74) *Attorney, Agent, or Firm* — Lathrop & Gage LLP

(57) ABSTRACT

A method of calibrating a multi-projector image display system is provided. According to the method, non-parametric calibration data for the display system is recovered and used to generate a non-parametric model of the display system. Local parametric models relating to the display surface of the projection screen are generated and are compared with data points defined by the non-parametric calibration data to identify one or more local errors in the non-parametric calibration data. The local errors in the non-parametric calibration data are converted to data points defined at least in part by the local parametric models and the projectors are operated to project an image on the image projection screen by utilizing a hybrid calibration model comprising data points taken from the non-parametric model and data points taken from one or more local parametric models. Additional embodiments are disclosed and claimed.

2 Claims, 2 Drawing Sheets

U.S. PATENT DOCUMENTS

| | | | |
|---|---|---|---|
| 6,695,451 | B1 | 2/2004 | Yamasaki et al. |
| 6,733,138 | B2 | 5/2004 | Raskar |
| 6,753,923 | B2 | 6/2004 | Gyoten |
| 6,814,448 | B2 | 11/2004 | Ioka |
| 6,819,318 | B1 | 11/2004 | Geng |
| 7,097,311 | B2 | 8/2006 | Jaynes et al. |
| 7,119,833 | B2 | 10/2006 | Jaynes et al. |
| 7,133,083 | B2 | 11/2006 | Jaynes et al. |
| 7,266,240 | B2 | 9/2007 | Matsuda |
| 2002/0024640 | A1 | 2/2002 | Ioka |
| 2002/0041364 | A1 | 4/2002 | Ioka |
| 2004/0085477 | A1 | 5/2004 | Majumder et al. |
| 2004/0169827 | A1 | 9/2004 | Kubo et al. |
| 2005/0287449 | A1 | 12/2005 | Matthys et al. |
| 2007/0188719 | A1 | 8/2007 | Jaynes et al. |
| 2007/0242240 | A1 | 10/2007 | Webb et al. |
| 2007/0268306 | A1 | 11/2007 | Webb et al. |
| 2007/0273795 | A1 | 11/2007 | Jaynes et al. |
| 2008/0024683 | A1 | 1/2008 | Damera-Venkata et al. |
| 2008/0129967 | A1 | 6/2008 | Webb et al. |
| 2008/0180467 | A1 | 7/2008 | Jaynes et al. |
| 2009/0262260 | A1 | 10/2009 | Jaynes et al. |
| 2009/0284555 | A1 | 11/2009 | Webb et al. |

OTHER PUBLICATIONS

Raskar, Ramesh et al.; Seamless Projection Overlaps using Image Warping and Intensity Blending; Fourth International Conference on Virtual Systems and Multimedia; Nov. 1998; pp. 1-5; Gifu, Japan.*

Webb, Stephen et al.; The DOME: A Portable Multi-Projector Visualization System for Digital Artifacts; IEEE Workshop on Emerging Display Technologies (w/VR 2005); Mar. 2005; Bonn, Germany.

Harville, Michael et al.; Practical Methods for Geometric and Photometric Correction of Tiled Projector Displays on Curved Surfaces; International Workshop on Projector-Camera Systems (ProCams 2006); Jun. 17, 2006; New York.

Fiala, Mark; Automatic Projector Calibration Using Self-Identifying Patterns; Proceedings of the 2005 IEEE Computer Society Conference on Computer Vision and Pattern Recognition (CVPR'05); 2005.

Griesser, Andreas et al.; Automatic Interactive Calibration of Multi-Projector-Camera Systems; Proceedings of the 2006 Conference on Computer Vision and Pattern Recognition Workshop; 2006.

Rehg, James et al.; Projected Light Displays Using Visual Feedback; Research at Intel; 2003; Intel Corporation.

International Search Report and Written Opinion dated Nov. 20, 2009 pertaining to International application No. PCT/US2009/040977.

Notice of Allowance pertaining to U.S. Appl. No. 11/737,817 dated Apr. 8, 2010.

Office Action pertaining to U.S. Appl. No. 11/737,817 dated Jan. 15, 2010.

Notice of Allowance pertaining to U.S. Appl. No. 11/737,823 dated Feb. 17, 2010.

Office Action pertaining to U.S. Appl. No. 11/737,823 dated Dec. 1, 2009.

Office Action pertaining to U.S. Appl. No. 11/675,226 dated Feb. 3, 2010.

U.S. Appl. No. 11/675,236, Notice of Allowance mailed Apr. 2, 2010, 14 pages.

U.S. Appl. No. 11/737,821, Notice of Allowance mailed Oct. 8, 2010, 9 pages.

U.S. Appl. No. 11/675,226, Notice of Allowance mailed Aug. 18, 2010, 9 pages.

* cited by examiner

HYBRID SYSTEM FOR MULTI-PROJECTOR GEOMETRY CALIBRATION

CROSS-REFERENCE TO RELATED APPLICATIONS

This application is a division of U.S. patent application Ser. No. 11/675,236, filed Feb. 15, 2007, which claims the benefit of U.S. Provisional Application Ser. No. 60/773,419, filed Feb. 15, 2006.

BACKGROUND AND SUMMARY OF THE INVENTION

The present invention relates to projection systems where multiple projectors are utilized to create respective complementary portions of a projected image, which may be a video or still image. More particularly, the present invention relates to methods of calibrating and operating such systems. According to one embodiment of the present invention, a method of calibrating a multi-projector image display system is provided. According to the method, non-parametric calibration data for the display system is recovered and used to generate a non-parametric mapping of positions in each projector to their position within a common global reference frame of the display system. Local parametric models that relate to the display surface are generated using a canonical description that either represents the image projection screen or the expected position of neighboring points when projected onto the screen. In addition, these local parametric models may represent the expected position of points in one device, e.g., a projector, when they are known in a second device, e.g., a camera. These local parametric models are compared with data points defined by the non-parametric calibration data to identify one or more local errors in the non-parametric calibration data. The local errors in the non-parametric calibration data are converted to data points by referring, at least in part, to the local parametric models. Although the conversion may be solely a function of the parametric model, it is contemplated that the conversion may be a function of both the parametric model and the non-parametric mapping, e.g., by referring to the predicted data points given by the parametric models and measurements taken from the non-parametric mapping. The projectors are operated to project an image on the image projection screen by utilizing a hybrid calibration model comprising data points taken from the non-parametric model and data points taken from one or more local parametric models.

In accordance with another embodiment of the present invention, a method of operating a multi-projector display system is provided. According to the method, the display system is operated according to an image rendering algorithm that incorporates a hybrid parametric/non-parametric calibration model.

In accordance with another embodiment of the present invention, a method of calibrating an image display system is provided. The system comprises a plurality of projectors oriented in the direction of an image projection screen and at least one calibration camera. According to the method, the calibration camera captures k distinct images of the image projection screen. All projectors contributing to each captured image render a set of fiducials captured by the calibration camera. A set of three-dimensional points corresponding to camera image points are computed as respective intersections of back-projected rays defined by the points and a canonical surface approximating the projection screen. The points are matched with projected fiducials to generate a set of corresponding match points. The set of three-dimensional points observed in different camera views are represented as a set of 3D surface points with a known neighborhood function. The 3D points are modeled as a constraint system such that the error distance between two points seen in two different camera views are computed as the geodesic distance between the first point, as seen in the second view, and the second point, as seen in that same view. Points that correspond to the same projector location but have different locations on the 3D surface are adjusted according to an error metric that minimizes the total error represented in the constraint system.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Generally, various embodiments of the present invention relate to calibration techniques that utilize local parametric models in conjunction with global non-parametric models. Although the calibration methodology of the present invention has broad applicability to any image projection system where an image or series of images are projected onto a viewing screen, the methodology of the various embodiment of the present invention are described herein in the context of a complex-surface multi-projector display system referred to as the Digital Object Media Environment (DOME).

Figure 1:
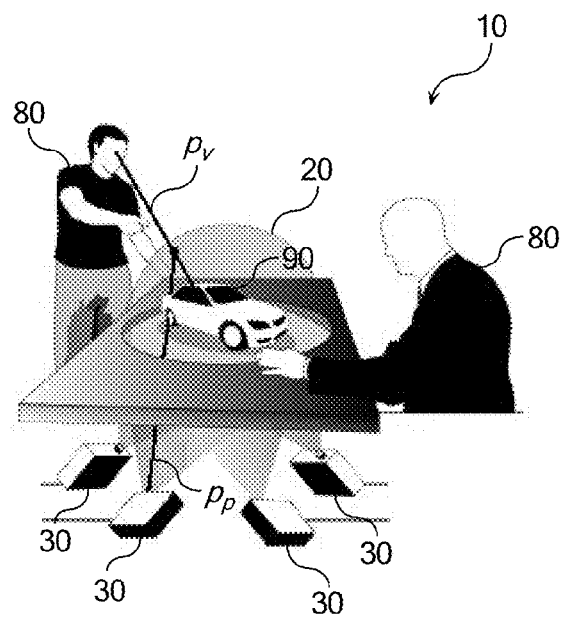
FIGS. 1 and 2 are schematic illustrations of an image projection system that may be calibrated according to the methodology of the present invention.
Figure 2:
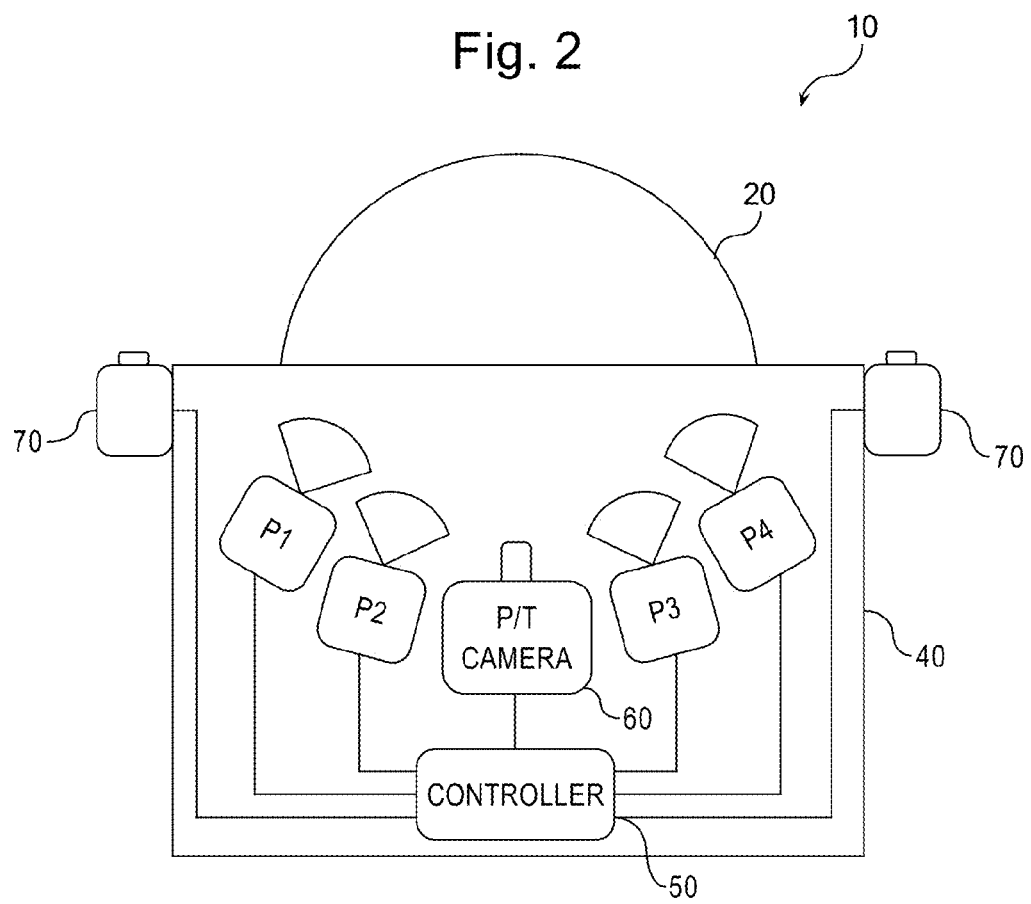

Referring to FIGS. 1 and 2, the DOME 10 is composed of a vacuum-shaped back projection screen 20 that is illuminated by a cluster of projectors 30 (P1-P4) mounted below the projection surface in a mobile cabinet 40. Each projector 30 is connected to a projection controller 50, which may comprise a single computer or a series of personal computers linked via an Ethernet cable or other suitable communications link. The controller 50 provides each projector with rendered images that contribute to the image display. A pan-tilt camera 60 is mounted within the DOME cabinet and is used in the calibration processes described herein. User head-positions are tracked via one or more wireless optical head-tracking units 70 or other suitable head-tracking hardware mounted to the DOME device 10. Head tracking enables the user 80 to move their head or body through the computer generated scene while the image 90 is continually updated to reflect the user's current eye positions. Given the dynamic head position of each user, the projectors can be controlled to generate images 90 that will synchronously provide users with the perception that the object being visualized is situated within the spherical DOME surface 20.

Referring to FIG. 1, at each instant a ray $P_v$ that passes from the center of projection of the user 80 to a point on the image 90 intersects the spherical surface 20 and defines what color should be projected at that point on the spherical DOME surface 20. System calibration determines what projector and ray $P_p$ is required to illuminate the point. Once calibrated, the projectors 30 and the controller 50 cooperate to render distinct images for both users 80. The DOME system 10 can be self-contained in a rolling cabinet that can be moved from one room to the next. Although the illustrated embodiment utilizes four projectors to illuminate a display surface that is approximately 32 inches in diameter, the calibration and rendering principles introduced herein are equally applicable to displays of different resolutions and sizes and display surfaces of arbitrary shape.

Figure 3:
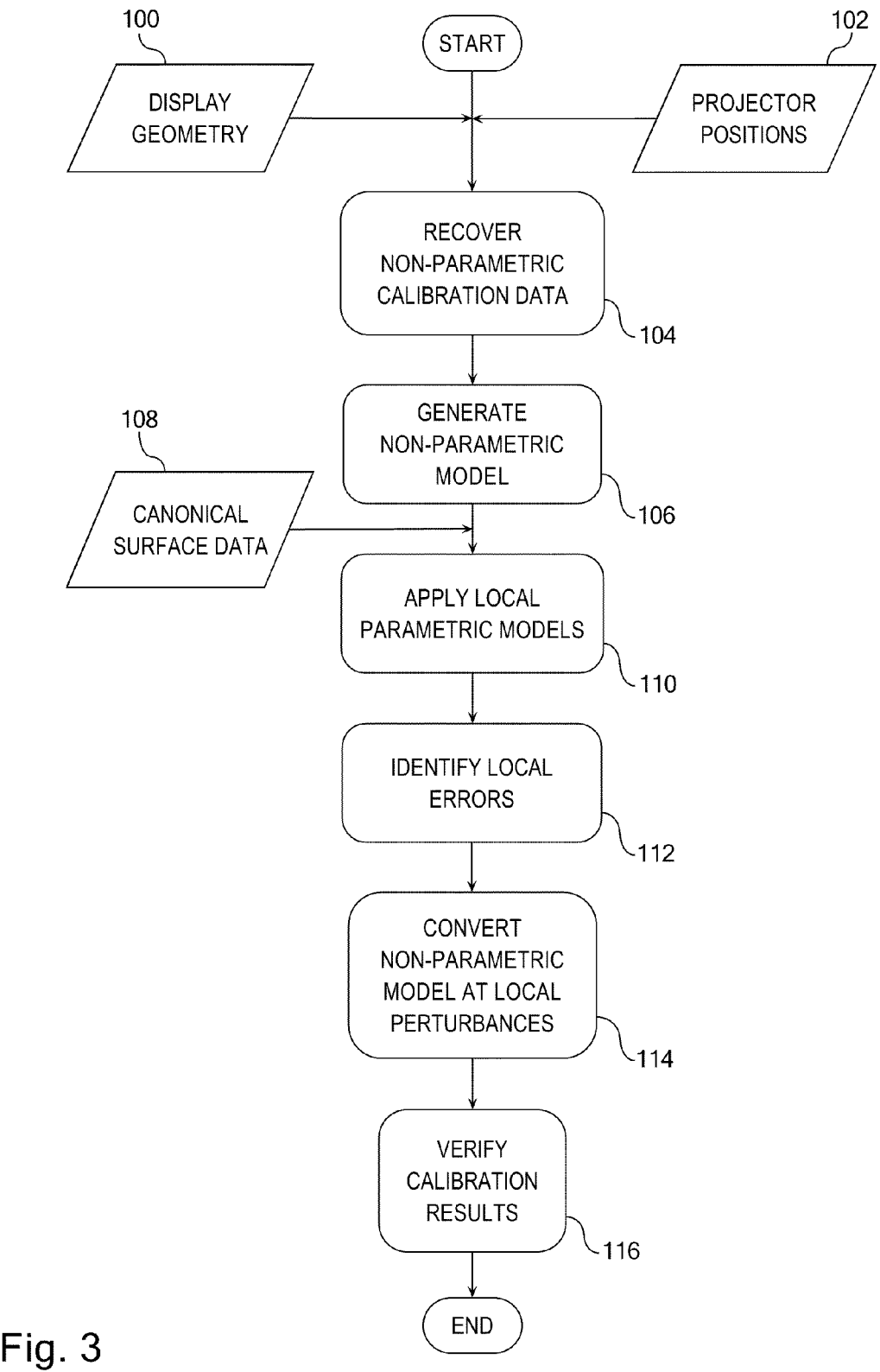
FIG. 3 is a flow chart illustrating a calibration method according to one embodiment of the present invention.

Referring now to the flow chart of FIG. 3, data regarding the geometry of the projection screen 20 and the respective geometric positions of the projectors 30 are input to initialize the illustrated calibration routine (see steps 100, 102). Non-parametric calibration data is then recovered utilizing the input data (see step 104) and is used to generate a non-parametric model of the display system (see step 106) that maps points in each projector to points in a global display space. Non-parametric calibration data may be recovered in a variety of ways. For example, and not by way of limitation, when projecting onto an irregular surface, or when the projector optics induce radial distortion in the projected image, the resulting image warp can be described as a point-wise map, e.g., a lookup table, encoding the projected positions of projected pixels on a pixel-wise basis or as a surface mesh whose vertices are points in the global display space that correspond to observations and whose edges represent adjacency. For the purposes of defining and describing the present invention, it is noted that data recovery should be read broadly enough to cover construction, calculation, generation, retrieval, or other means of obtaining or creating this non-parametric mapping of projector pixels to a common coordinate system.

Once the non-parametric model has been established (see step 106), canonical surface data is used to apply local parametric models to the global, non-parametric calibration data (see steps 108, 110). In this manner, the inherent uniformity of the local parametric models can be used to correct local artifacts and other discontinuities generated by the global, non-parametric calibration data. Broader application of the local parametric models is discouraged here because, although the parametric calibration data helps guarantee smooth calibration across the projector field by minimizing local irregularities within a single projector, global parametric solutions are typically ineffective between adjacent projectors and can lead to abrupt geometric discontinuities at projector edges. In addition, strict adherence to a parametric model often requires that the model be correct and in correspondence with the display surface over a large area, while multiple, local models typically only need to describe how points relate to one another locally.

The calibration scheme illustrated in FIG. 3 is a fundamentally non-parametric system that incorporates parametric constraints in local regions to detect and correct non-smooth areas in the calibration map. As is noted above, the calibration routine generally proceeds in two stages. First, the non-parametric calibration data is recovered (see step 106). This data is globally accurate, but subject to some local perturbances due to image processing, display non-uniformity, or other artifacts. The non-parametric phase of model acquisition determines a mapping from each projector pixel to its corresponding position in a common coordinate system. Typically, the parametric models are only applied once projector pixels have been mapped to a common, global space.

Once this global, non-parametric model has been acquired (see step 108), the local parametric models are applied over local regions (see step 110). If the observed, non-parametric model differs significantly from the predicted, parametric model, individual points are identified as local errors (see step 112). These local errors are eliminated from the non-parametric model by replacing the perturbed local data points within the non-parametric model with a corresponding point generated by the parametric model (see step 114). This replacement step can include, but is not limited to, a straightforward evaluation of the parametric model at an interpolated point or some weighted contribution of the observed point and the point implied by the parametric model. By using the parametric model independently, in small regions, the global problems typically associated with parametric calibration data is avoided, while retaining the local consistency that the parametric model provides. Calibration results can be verified by generating a calibration image that is configured such that errors in the hybrid calibration routine can be readily identified by a user 80 or one or more image analysis cameras when the image is displayed on the projection screen. For example, and not by way of limitation, the calibration image may be constructed as a 3D mesh and displayed on the projection screen 20. An example of the use of a suitable mesh is described in detail below with reference to the multi-projector system 10 illustrated in FIGS. 1 and 2.

Thus, in the multi-projector calibration scheme illustrated in FIG. 3, each projector pixel is registered to a canonical surface that can approximate the actual display surface. Local perturbations of these mappings account for deviations from the canonical surface. These perturbations, which can arise from screen surface abnormalities, error in the estimated camera position, and differences in the canonical model and true display shape, are classified as local errors and are corrected by replacing perturbed local data points within the non-parametric model with a corresponding point generated by the parametric model Likewise, a new point can be generated through a weighted combination of the point predicted by the local parametric model and the existing data point. This approach is motivated the observation that local errors, i.e., discontinuities in the projected image where none exists on the projection surface, are far more problematic than global, correlated errors.

For example, and not by way of limitation, in the multi-projector system 10 illustrated in FIGS. 1 and 2, a hemisphere is the canonical model, but the true shape of the display surface is a hemisphere intersected with a cone. The pan-tilt camera 60 actuates to several overlapping view positions to capture k distinct images such that all points on the display surface 20 are seen in at least one image. For each camera position, all visible projectors 30 (P1-P4) render a set of Gaussian fiducials that are then captured in the camera 60. Using binary encoding techniques, the observed fiducials are matched with projected targets to generate a set of corresponding match points. For a given pan-tilt position k, the translation $[xyz]_C^T$ and rotation parameters of the camera 60 are computed from an estimated initial position of the camera in the world reference frame. The camera intrinsics, M are recovered before the camera 60 is placed in the DOME 10 and are then coupled with each view position to derive a complete projection matrix:

$$P_k = M \begin{bmatrix} e_1 \cdot r_1^k & e_1 \cdot r_2^k & e_1 \cdot r_3^k & -R_1^T T_x \\ e_2 \cdot r_1^k & e_2 \cdot r_2^k & e_2 \cdot r_3^k & -R_2^T T_y \\ e_3 \cdot r_1^k & e_3 \cdot r_2^k & e_3 \cdot r_3^k & -R_3^T T_z \\ 0 & 0 & 0 & 1 \end{bmatrix} C_w^p$$

where $e_i$ are the basis vectors of the estimated coordinate system for the camera 60 in the pan-tilt reference frame, $r_i^k$ are the basis vectors for pan-tilt frame at position k, and T is the estimated offset from camera to pan-tilt. $R_i$ is the $i^{th}$ column of the upper left 3×3 rotation components of the transform matrix. Finally, $C_\omega^P$ is the coordinate system change from world, i.e., from where the canonical surface is defined to the estimated frame of the pan-tilt camera 60.

Given the assumption that observed points in the camera plane arise from projected fiducials on the canonical surface, then the three-dimensional point $[x\ y\ z]^T$ corresponding to image point $(i, j)_k$ is computed as the intersection of the canonical surface with the back-projected ray defined by the point and focal length f, $P_k^{-1}[0001]^T + \lambda P_k^{-1}[ijf1]^T$. Preferably, the observed match points are back-projected prior to evaluation and application of the parametric model.

Because the canonical surface in the case of the DOME 10 is a hemisphere, the center of a match point in the projector frame $p_p$ can be related to a corresponding point in the camera $p_c$ via a second degree polynomial, e.g., $p_c = P(p_p)$. This locally parametric model can be used to eliminate invalid match points and dramatically increase the robustness of the calibration phase. The locally parametric model is only used to eliminate potentially noisy match points and does not typically play a role in global calibration.

The nine parameters of P can be recovered via a robust least squares fit, for a given match point over a 5×5 grid of neighboring points. Typically, the match point under consideration is not used during the fit. Instead, the distance between the match point and the fit model P is measured and if this distance exceeds some threshold, the match point is considered to be in error, and is discarded. The local parametric model is then used to interpolate a new match point at this location.

This set of three-dimensional points observed in different camera views must be registered to a single three-dimensional point cloud. If the same projector point is seen in multiple views only one is selected by iterating through multiple camera views and adding only unique points until the point cloud is fully populated. Next, a 3D Deluanay triangulation is performed on this point cloud to compute neighbor relations.

Finally, this 3D mesh is modeled as a constraint system in which each edge is assigned a weight of one and a length, i.e., an error distance, that corresponds to the separation of the two points on the sphere. In the case when two points arise from the same camera view, the distance is equivalent to the geodesic distance. However, if the two points $p_k^1$ and $p_l^2$ are seen in two different camera views, the distance between the two points $D(p_k^1, p_l^2)$ is computed as $D(p_l^1, p_l^2)$, i.e., the geodesic distance between the first point $p_l^1$, as seen in the second view, and the second point $p_l^2$ as seen in that same view.

Following error distance assignments, the constraint model is relaxed in order to minimize the total error contained in the constraint system. This minimization phase may use a variety of minimization techniques including traditional gradient, downhill simplex, simulated annealing, or any other conventional or yet to be developed energy minimization technique. As a result, local errors are distributed over the mesh, including those arising from error propagation between views, error in estimated camera positions, improperly modeled radial distortion, etc. This yields a perceptually consistent calibration across all projectors 30.

Once the projectors 30 have been calibrated, a cooperative rendering algorithm then generates a frame-synchronized image for each user's head position. Although the projectors could be dynamically assigned to each viewer 80 based on their relative head positions, it is often sufficient to partition the set of pixels into two distinct views that illuminate opposite sides of the spherical DOME surface 20. In this manner, each user 80 can see a correct view of the model being visualized for collaborative purposes. Image rendering may be controlled in a variety of conventional or yet-to-be developed ways, including those where two-pass algorithm is utilized to estimate the projection surface automatically.

At each frame, the head-positions of the viewers 80 are determined via the head-tracking units 70 and then distributed to individual projection clients or to an integrated controller 50 emulating the clients via a multi-cast signal over a local network or other communications link Each rendering client then generates an image of the object from the viewpoint of the current head-position.

The rendered view for each projector 30 is then registered with the global coordinate system by back-projecting the rendered frame buffer onto the display surface 20. This can, for example, be accomplished via projective texture mapping or any other suitable projection routine. Finally, it is contemplated that intensity blending can be incorporated into the projection routine by using traditional multi-projector blending or modified multi-projector blending routines including, for example, those that utilize a distance metric computed on the sphere.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention. For example, although the calibration methodology of the present invention has been described herein in the context of a complex-surface multi-projector display system referred to as the Digital Object Media Environment (DOME), the appended claims should not be limited to use with the DOME or similar projection systems unless they expressly recite the DOME.

What is claimed is:

1. A method of calibrating an image display system comprising a plurality of projectors oriented in the direction of an image projection screen and at least one calibration camera, wherein at least the following conditions apply to the method:

the calibration camera captures k distinct images of the image projection screen;

all projectors contributing to each captured image render a set of fiducials captured by the calibration camera;

a set of three-dimensional points corresponding to camera image points are computed as respective intersections of back-projected rays defined by the points and a canonical surface approximating the projection screen;

the points are matched with projected fiducials to generate a set of corresponding match points;

the set of three-dimensional points observed in different camera views are represented as a set of 3D surface points with a known neighborhood function;

the 3D points are modeled as a constraint system such that the error distance between two points seen in two different camera views are computed as the geodesic distance between the first point, as seen in the second view, and the second point, as seen in that same view; and points that correspond to the same projector location but have different locations on the 3D surface are adjusted according to an error metric that minimizes the total error represented in the constraint system.

2. A method as claimed in claim 1 wherein the projectors are operated to project an image on the image projection screen by utilizing a hybrid calibration model comprising data points taken from a non-parametric model of the display system derived from the constraint system and data points taken from one or more local parametric models of the display system.

* * * * *